UNITED STATES PATENT OFFICE.

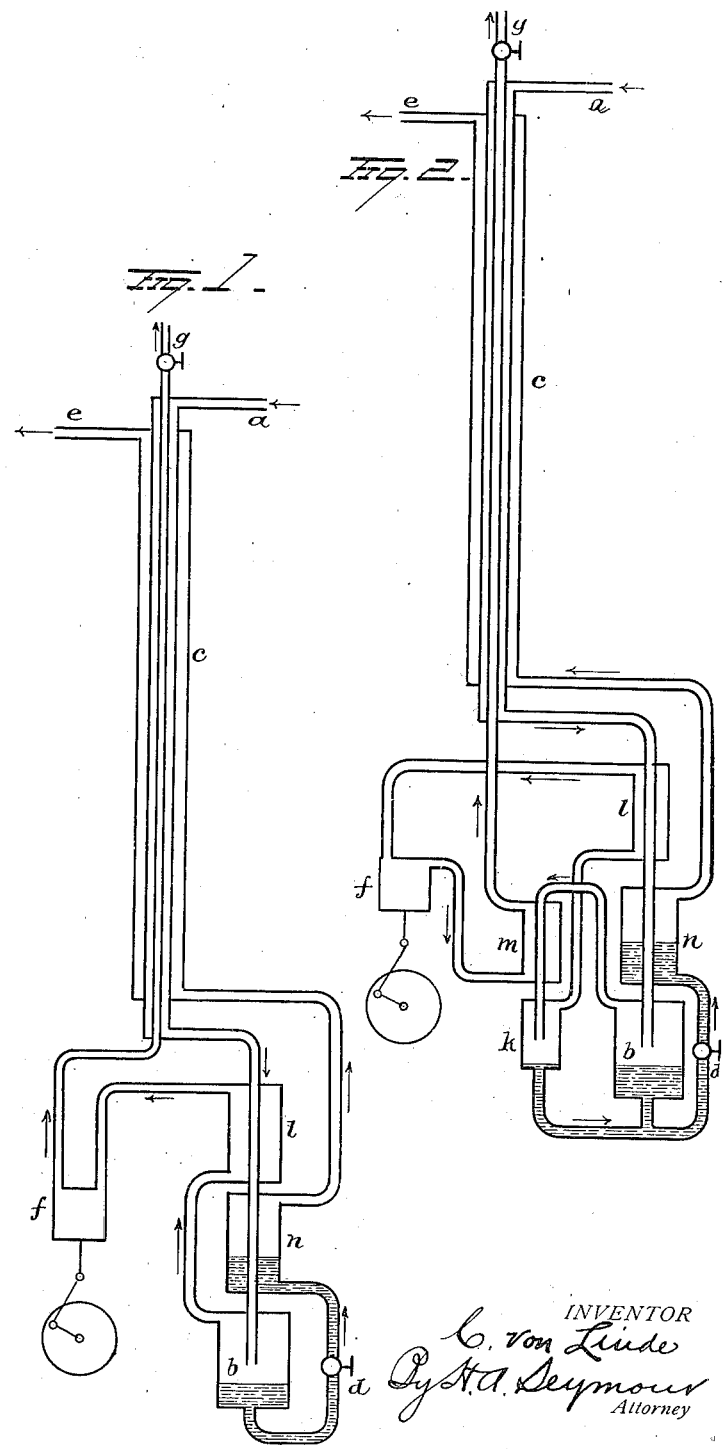

CARL von LINDE, OF MUNICH, GERMANY.

APPARATUS FOR THE SEPARATION OF HYDROGEN.

1,027,863.   Specification of Letters Patent.   Patented May 28, 1912.

Application filed October 23, 1911. Serial No. 656,093.

*To all whom it may concern:*

Be it known that I, CARL VON LINDE, of Munich, in the Kingdom of Bavaria, Germany, have invented certain new and useful Improvements in Apparatus for the Separation of Hydrogen; and I do hereby declare the following to be a full, clear, and exact description of the invention, such as will enable others skilled in the art to which it appertains to make and use the same.

This invention relates to improvements in apparatus for the separation of hydrogen from a mixture of gases, and consists in certain novel features as hereinafter described and pointed out in the claim.

When water-gas is resolved into one part rich in hydrogen and one part rich in carbon-monoxid, the former contains more carbon monoxid and nitrogen than is desirable for many purposes, especially for use in airships, when the liquid air or nitrogen used for cooling evaporates at atmospheric pressure. The reason for this is that, at the normal boiling temperature of liquid nitrogen and to a still greater degree at the normal boiling temperature of liquid air, the partial pressures of the carbon-monoxid and nitrogen over the liquid separated out from the water-gas are still too high. If the liquid air or the liquid nitrogen employed for cooling is allowed to evaporate at less than atmospheric pressure, its temperature falls below the normal boiling point and at the same time a corresponding reduction takes place in the partial pressure of the gases mixed with the hydrogen, so that they are almost completely liquefied and only a very small residue remains as gas mixed with the hydrogen. In carrying out this process, it is preferable not to bring the entire quantity of liquid separated from the gas mixture to the lowest temperature, but first to liquefy the larger part of the constituents by means of the liquid (which in the case of water-gas consists principally of carbon-monoxid) which is separated out and then expanded to atmospheric pressure, and after that to bring the unliquefied part to the lowest temperature, which is accomplished with the aid of liquid air or liquid nitrogen boiling in a vacuum. The small quantity of liquid thus separated out is combined with the main quantity of the liquid previously separated, is reduced in pressure and employed for the separation of the mixture of gases. The unliquefied part, which now consists of very pure hydrogen, is separately expanded and conducted out through the counter current apparatus.

In the accompanying drawings, Figures 1 and 2 are views illustrating, diagrammatically, embodiments of my invention.

In order to allow the unliquefied part of the gas mixture, that is the hydrogen, instead of expanding through the valve $f$ to expand and in expanding to perform external work and to apply the cooling effect thus produced in the apparatus, then certain requirements are to be observed. If the compressed gas mixture, freed from the major part of the constituents other than hydrogen at a temperature corresponding to the boiling point of carbon-monoxid, were allowed to expand and perform external work, so low a temperature would be reached that all the admixtures not previously liquefied would become solid and would obstruct the elements of the expansion mechanism. In order to avoid this objection, the gas mixture, freed from the major part of its constituents, is slightly heated by passing it in counter-current with the incoming, as yet not decomposed gas mixture and is then passed into the expanding mechanism. If in the operation of the process the hydrogen obtained is not desired of the highest purity, the expanded gas can be passed out direct through the heat inter-changer. But if it is desired to obtain hydrogen of the greatest possible purity, the expansion is so performed that a correspondingly low temperature is obtained at which the constituent impurities in the hydrogen do not indeed become solid but have only a very slight vapor tension. This temperature is then transmitted to the hydrogen which still contains a few impurities and frees it from these impurities before it is conducted to the expansion apparatus. To carry out this process the apparatus diagrammatically represented in Figs. 1 and 2 are used. In Fig. 1 the compressed gas mixture, for example water-gas, is introduced at $a$ and is cooled in the two counter-current apparatus $c$ and $l$. The condensable portions of the mixture are then liquefied by the liquid boiling in the receptacle $n$, are separated in the receptacle $b$, relieved of pressure at the expansion valve $d$, evaporated in the receptacle $n$ and led off at $e$ through counter-current apparatus $c$. The unliquefied part from the receptacle $b$ is slightly warmed in the counter-current apparatus $l$, is then expanded in the expansion apparatus $f$, performing external work, and is finally led off at $g$ through the counter-current apparatus.

The apparatus shown in Fig. 2 differs from that in Fig. 1 only in that the pure hydrogen which has expanded in the apparatus at $f$, and before it is led to the counter-current apparatus, flows through a second heat-interchanger $m$, in which it further cools the hydrogen already freed from the major part of its impurities, coming from the separating receptacle $b$. The thus liquefied remaining portion of the impurities are separated out in the receptacle $k$ and unite with the major part of the liquefied constituents coming from the receptacle $b$.

Having fully described my invention what I claim as new and desire to secure by Letters-Patent, is:

In apparatus for the separation of hydrogen from a mixture of gases, the combination with heat interchanging means comprising an inlet pipe for a mixture of gases, an outlet pipe therein for hydrogen and an outlet pipe surrounding the said inlet pipe for escape of fluid other than hydrogen, liquid collecting means communicating with the inlet pipe of the heat interchanging means, expansion means between said collecting means and the outlet pipe of the heat interchanging means through which the hydrogen passes, expansion means between said collecting means and the outlet pipe of the heat interchanging means through which the other fluids pass and means for raising the temperature of said hydrogen before expansion.

In testimony whereof, I have signed this specification in the presence of two subscribing witnesses.

CARL von LINDE.

Witnesses:
  RICHARD LEMP,
  MATHILDE K. HELD.